June 4, 1940.  H. B. BEER  2,203,188

TREATMENT OF AIR

Filed Nov. 22, 1937

INVENTOR
Henri B. Beer
BY
ATTORNEY

Patented June 4, 1940

2,203,188

UNITED STATES PATENT OFFICE 2,203,188

TREATMENT OF AIR

Henri Bernard Beer, The Hague, Netherlands

Application November 22, 1937, Serial No. 175,945
In Great Britain December 8, 1936

10 Claims. (Cl. 21—53)

My invention relates to the treatment of air.

My invention has for its object to provide an improved process and apparatus, whereby air after treatment thereby is highly sterile and odourless.

My invention consists in the improved process and combination of parts set forth in the claims appended hereto.

Figure 1:
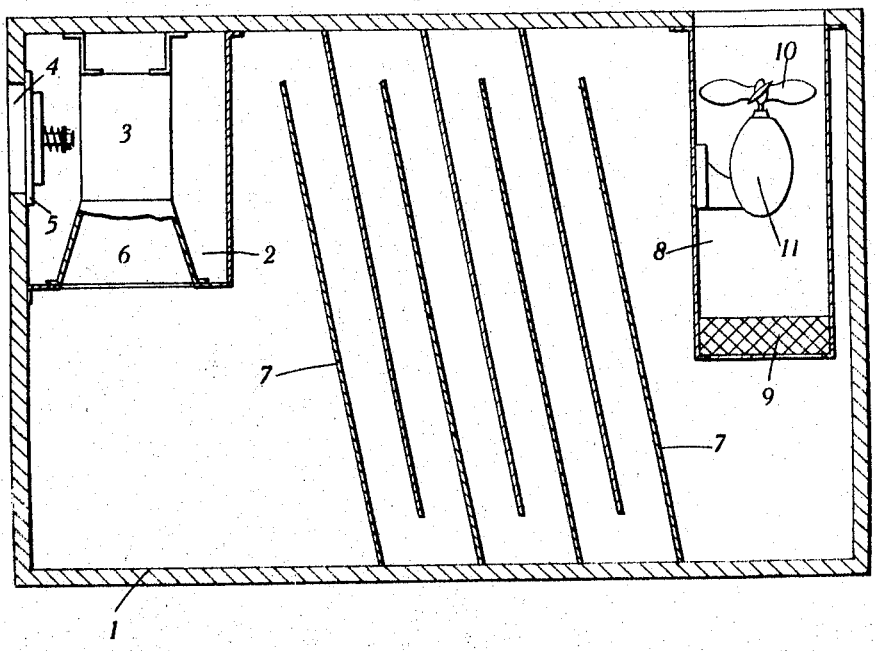

Referring now to the accompanying drawing, Figure 1 shows an apparatus for treating the air in a room according to my invention.

Figure 2:
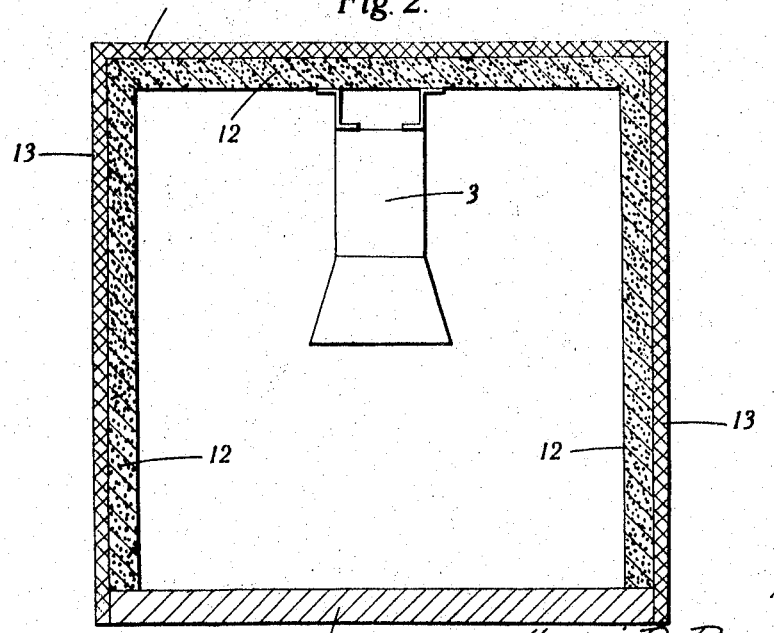

Figure 2 shows a modified form of apparatus.

In carrying my invention into effect, according to one form, I use an ozonizer of any suitable known type through which the air to be treated is passed and ozonized. In the delivery duct of the ozonizer I arrange a filter for splitting up the ozone in the ozonized air as it passes through the filter into $O_2$ and O. The filter may be of silver oxide, manganese dioxide, lead peroxide, powdered glass or any other suitable substance or composition.

The filter which I prefer to use, in the present case, is formed of fine wire gauze, the wire used in the gauze being oxidized silver wire. The filter is constructed with a number of sheets of this gauze packed tightly together.

As the ozonized air passes through this filter, the ozone is split up into $O_2$ and O by the silver oxide, the O being practically in the nascent state. The mixture as it issues from the filter is odourless and retains to a certain extent the sterilizing, deodorizing and oxidizing properties of ozonized air, while at the same time being innocuous.

In Figure 1 I have illustrated diagrammatically an arrangement for treating the air in a room so as to maintain it more or less in a sterilized condition, and free it from any odours present. In this arrangement I provide a casing 1 formed of any suitable material, preferably non-metallic, such as wood or synthetic resin. The casing is constructed so as to be gas-tight and any joints therein are made of material which is not affected by ozone. A compartment 2 for an ozonizer 3 is formed within the casing 1, and is provided with an inlet 4 for the air to be treated, the inlet 4 being fitted with a spring-mounted non-return valve 5 which opens inwards. The ozonizer 3 discharges the ozonized air into the casing 1 through the duct 6. Within the casing 1 there are arranged a number of baffle plates 7 which are disposed in such a manner as to provide a tortuous path for the air passing through the casing. The casing 1 is also provided with an outlet pipe 8, in the inner end of which a filter 9 is disposed. The filter 9 is preferably formed of oxidized silver wire gauze as above described. A fan 10 driven by an electromotor 11 is arranged in the outlet pipe 8, above the filter 9 and is adapted to draw air from the room in which the casing 1 is disposed, into the ozonizer 3 through the inlet 4 and the non-return valve 5, the ozonized air from the ozonizer thereafter passing through the casing 1 between the baffle plates 7 to the filter 9 and thence through the filter and outlet pipe 8 into the room.

The impure air drawn from the room into the casing 1 through the ozonizer 3 is thus subjected to a very strong sterilizing action by the ozone generated in the ozonizer, and on its passage through the filter 9 the ozone in the mixture is split up into $O_2$ and O as before, so that the air discharged into the room in addition to being sterilized carries a certain percentage of more or less nascent oxygen along with it, and has thus a strong sterilizing action on the air in the room.

By circulating the air in the room through the apparatus above described, the air is maintained in practically a sterilized condition and free from odours and germs.

In Figure 2 I have shown an apparatus in which the ozonizer 3 is situated in a casing which is provided with walls 12 on its top and sides formed of porous material, such as unglazed earthenware, the outside of these walls being coated with a porous layer 13 of any of the filtering materials above described. The bottom 14 of the casing is formed of non-porous material. The ozonized air generated by the ozonizer 3, by reason of its specific gravity being greater than air, diffuses through the walls 12 and layers 13 and is split up by the latter into $O_2$ and O before passing into the room, while the air in the room likewise diffuses through the layers 13 and walls 12 into the interior of the casing where it is sterilized. A continuous flow of air from the room thus takes place into the casing, and of air containing more or less nascent oxygen into the room from the interior of the casing so that the necessary circulation is maintained without the use of a fan.

Instead of passing the ozonized air through a filter to split the ozone therein into $O_2$ and O, the ozone in the air may be split up by passing it over surfaces coated with any of the materials before described.

When a very high percentage of ozone is imparted to the air treated in the apparatus according to the invention, the air issuing from the filter will have a greater sterilizing effect owing to the large amount of practically nascent oxygen which is liberated by the treated ozonized air.

By the treatment of air according to the invention, it is rendered highly sterile, while at the same time it is odourless and in addition is innocuous.

I claim:

1. A process for the treatment of air consisting in ozonizing the air to be treated so as to sterilize it and thereafter splitting up the ozone in the ozonized air to render the sterilized air practically free from ozone by subjecting the ozonized air to the action of a metallic oxide, in a dry condition at normal temperature.

2. An apparatus for treating air, having in combination an ozonizer for ozonizing air which enters the apparatus; together with metallic oxide means in a dry condition and at normal temperature for splitting up the ozone in said ozonized air before said air leaves the apparatus.

3. An apparatus for treating air, having in combination a casing through which air passes; air-ozonizing means arranged in said casing; together with metallic oxide means in a dry condition and at normal temperature for splitting up ozone in air ozonized by said air-ozonizing means before said air leaves said casing.

4. An apparatus for treating air, having in combination a casing provided with an inlet and an outlet for air; means for passing air through said casing; air ozonizing means arranged in said casing adjacent to the inlet thereof; baffles in said casing arranged to form a tortuous path for air ozonized by said air-ozonizing means; together with metallic oxide filter means in a dry condition and at normal temperature arranged in said outlet for splitting up ozone in said ozonized air before said air leaves said casing.

5. An apparatus for treating air, having in combination a casing provided with an air inlet at one end thereof and an air outlet at its opposite end; a fan disposed in said outlet for drawing air through said inlet and discharging it through said outlet; baffles in said casing disposed between said inlet and said outlet to provide a tortuous path therebetween; an ozonizer arranged adjacent to said air inlet in said casing, for ozonizing air as it enters said casing; together with metallic oxide filter means in a dry condition and at normal temperature arranged in said outlet of said casing and disposed in the air stream in advance of said fan, for splitting up the ozone in the ozonized air.

6. An apparatus for treating air, having in combination a casing provided with an air inlet at one end thereof and an air outlet at its opposite end; a non-return valve arranged at said air inlet; a fan disposed in said outlet, for drawing air through said inlet and through said non-return valve and discharging it through said outlet; baffles in said casing disposed between said inlet and said outlet to provide a tortuous path therebetween; an ozonizer arranged adjacent to said air inlet, for ozonizing air as it enters said casing; together with metallic oxide filter means in a dry condition and at normal temperature arranged in said outlet and disposed in the air stream in advance of said fan, for splitting up the ozone in said ozonized air.

7. An apparatus for treating air, having in combination a casing provided with porous walls having a porous layer of metallic oxide material in a dry condition and at normal temperature; together with air-ozonizing means arranged within said casing.

8. A process for the treatment of air consisting in ozonizing the air to be treated so as to sterilize it, and thereafter splitting up the ozone in the ozonized air to render the sterilized air practically free from ozone by subjecting it to the action of silver oxide in a dry condition and at normal temperature.

9. A process for the treatment of air consisting in ozonizing the air to be treated so as to sterilize it and thereafter splitting up the ozone in the ozonized air to render the sterilized air free from ozone by subjecting it to the action of manganese dioxide in a dry condition and at normal temperature.

10. A process for the treatment of air consisting in ozonizing the air to be treated so as to sterilize it and thereafter splitting up the ozone in the ozonized air to render the sterilized air practically free from ozone by subjecting it to the action of lead peroxide in a dry condition and at normal temperature.

HENRI BERNARD BEER.